(No Model.)
J. T. WARD.
IRON FENCE JOINT.
No. 548,333. Patented Oct. 22, 1895.
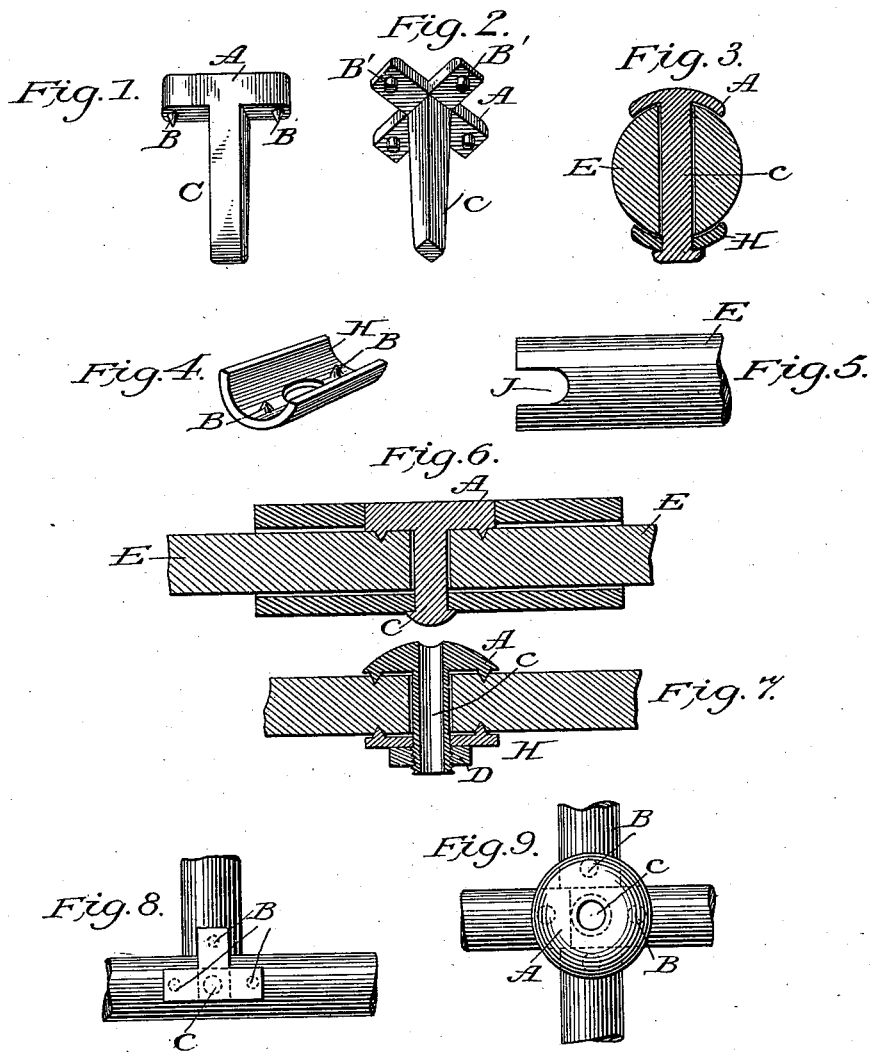
Witnesses.
Jno. Stokes Adams.
John J. Bigley.
Inventor.
Joseph T. Ward
By Thos Teasdale his attorney

UNITED STATES PATENT OFFICE.

JOSEPH T. WARD, OF PHILADELPHIA, PENNSYLVANIA.

IRON-FENCE JOINT.

SPECIFICATION forming part of Letters Patent No. 548,333, dated October 22, 1895.

Application filed December 5, 1893. Serial No. 492,877. (No model.)

*To all whom it may concern:*

Be it known that I, JOSEPH T. WARD, a citizen of the United States, residing at Philadelphia, (Germantown,) county of Philadelphia, State of Pennsylvania, have invented a new and useful Rivet-Joint, of which the following is a specification.

My invention relates to an improvement in devices for fastening the ends of rods, bars, or rails together; and the object of my invention is to afford a cheap and effective method of fastening or joining rods, bars, or rails together with or without a sleeve or collar, so that they may not separate from each other, and when in a sleeve or collar so that they may not slip from the sleeve. The device finds its principal use in fence-joints. I attain these objects by the mechanism illustrated in the accompanying drawings, in which—

Figure 1 is a view in perspective of the rivet with head composed of two arms. Fig. 2 is a view in perspective of the rivet with head composed of four arms; Fig. 3, a cross-section of rivet, bar, and plate. Fig. 4 is a view in perspective of the washer or plate with points B on upper surface I. Fig. 5 is a top view of portions of rod or bar, showing slot or groove J for stem of rivet or bolt. Fig. 6 is a longitudinal section of the rivet, sleeve, and ends of rods. Fig. 7 is a longitudinal section of the rivet and ends of rods and plate or washer H where no sleeve is used. Fig. 8 is a top view of rivet, showing head with three arms holding together the ends of three rods or bars, the dotted circles B indicating points on under side of head of rivet and dotted lines C indicating stem of rivet. Fig. 9 is a top view of rivet or bolt with round solid head holding together the ends of four rods or bars.

Similar letters refer to similar parts throughout the several views.

The rivet may be made of any metal, solid or with hollow stem opening through head. The lower end of stem C may be malleable for purpose of turning or riveting.

The head A may be solid or may consist of two or more arms and may be case-hardened, so that the points B upon its under side may readily make the indentations in ends of bars without danger of flattening out. Instead of points B blunt plugs B' may be used, in which case holes must first be made in ends of rods for plugs to fit into. When used in combination with a sleeve, the sleeve has in the middle of one side a hole large enough to allow the stem C of the rivet to pass through it, and just above this hole, on the opposite side of sleeve, is a hole large enough to allow the head A to pass through it. The rods E E, which are inserted into either end of the sleeve, may meet in the center or on either side of the stem C of the rivet. The head A of the rivet being hammered down against the bars E E the points or plugs are driven or inserted into the bars E near their ends. The lower end of the stem C of the rivet is then turned or riveted against the under part of sleeve, thereby keeping said rivet tightly in place and, holding the rods E securely together, prevents them from separating from each other or from slipping from the sleeve.

When the rivet is used for holding rods or bars together without a sleeve, as in Fig. 7, the head A of the rivet being hammered down against the rods or bars E and the points or plugs B being driven or inserted into the said rods or bars, as above described, a plate or washer H, having points or plugs upon its upper side, is slipped upon the lower end of stem C of the rivet. The said points or plugs being driven or inserted into under side of said rods or bars the projecting end of stem is then bolted or riveted, whereby the rods or bars are securely held together.

What I claim as my invention, and desire to secure by Letters Patent, is—

1. The combination of a rivet having points or plugs on under side of head, with a sleeve having a hole on one side to allow head of rivet to pass through it and a hole on opposite side to allow stem of rivet to pass through it, substantially as described.

2. The combination of a rivet, having points or plugs on under side of its head and a sleeve having hole on one side to allow head of rivet to pass through it and hole on opposite side to allow stem of rivet to pass through it with rods meeting within the sleeve at stem of rivet substantially as described.

JOSEPH T. WARD.

Witnesses:
JOSEPH WARD,
JNO. STOKES ADAMS.